United States Patent [19]
Savinsky

[11] Patent Number: 5,806,350
[45] Date of Patent: Sep. 15, 1998

[54] ANTI-THEFT DEVICE

[76] Inventor: Stanislav Savinsky, 12-59 George St., Fairlawn, N.J. 07410

[21] Appl. No.: 827,177

[22] Filed: Mar. 27, 1997

[51] Int. Cl.[6] .................................................... E05B 17/14
[52] U.S. Cl. .................................. 70/18; 70/169; 70/199; 70/209; 70/238; 70/246; 70/247; 70/428; 70/455
[58] Field of Search .................................. 70/18, 158–169, 70/198–203, 209, 211, 212, 254, 237, 238, 245–248, 417, 455, 423–428

[56] References Cited

U.S. PATENT DOCUMENTS

| | | | |
|---|---|---|---|
| 1,216,871 | 2/1917 | Snyder | 70/211 |
| 1,228,123 | 5/1917 | McDermott | 70/200 |
| 3,665,738 | 5/1972 | Pescuma et al. | 70/237 X |
| 3,811,303 | 5/1974 | Robertson | 70/237 |
| 4,008,589 | 2/1977 | Harrell | 70/237 X |
| 4,008,590 | 2/1977 | Berkowitz et al. | 70/428 X |
| 4,561,273 | 12/1985 | Robinson | 70/426 |
| 4,726,207 | 2/1988 | Gifford | 70/237 X |
| 4,955,215 | 9/1990 | Eremita | 70/428 X |
| 5,212,970 | 5/1993 | Harrell | 70/455 X |
| 5,235,830 | 8/1993 | Beuge | 70/159 X |
| 5,461,891 | 10/1995 | Noel | 70/237 X |
| 5,566,560 | 10/1996 | LiCausi | 70/424 X |

*Primary Examiner*—Lloyd A. Gall
*Attorney, Agent, or Firm*—Iiya Zhorovsky

[57] ABSTRACT

An anti-theft device has a substantially cylindrical body composed of two semi-cylindrical shells, and structure for hingedly connecting the shells with one another at one circumferential end so that the shells are turnable between an open position in which the other circumferential ends of the body are spaced from one another and a closed position in which the cylindrical body is arranged on a steering column and the other ends of the shells are locked with one another, the cylindrical body being formed so that it completely covers the ignition lock in the closed position so that an unauthorized person can not get access to the ignition lock, and structure for locking the other ends of the shells in the closed position.

7 Claims, 4 Drawing Sheets

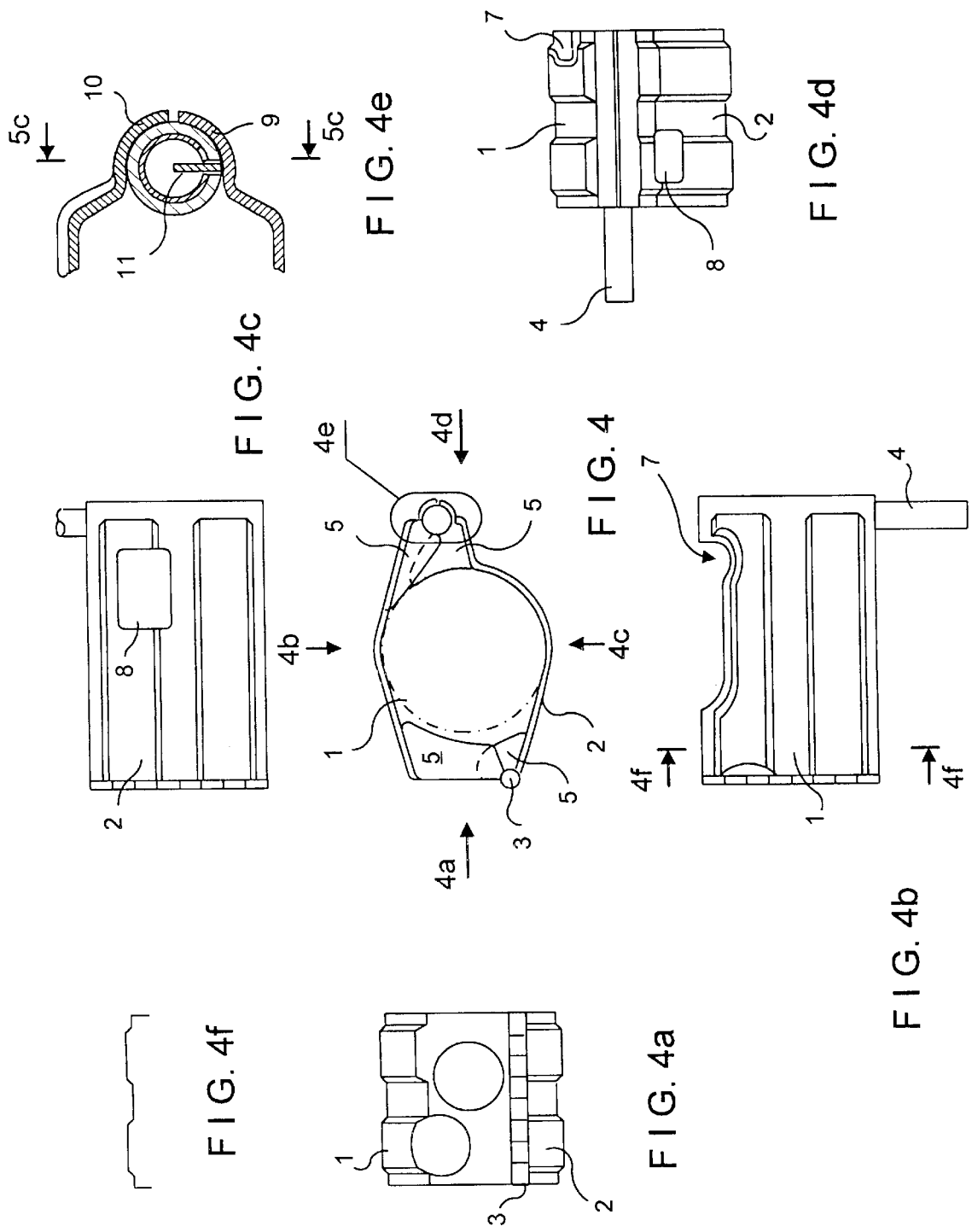

5,806,350

ANTI-THEFT DEVICE

BACKGROUND OF THE INVENTION

The present invention relates to an anti-theft device for vehicles.

Anti-theft devices are known in many modifications. It is believed that it is advisable to further improve the anti-theft devices and to provide more efficient and reliable devices of this type.

SUMMARY OF THE INVENTION

Accordingly, it is an object of the present invention to provide an anti-theft device which is a further improvement of existing devices.

In keeping with these objects and with others which will become apparent hereinafter, one feature of the present invention resides, briefly stated, in an anti-theft device which has a substantially cylindrical body composed of two semi-cylindrical shells and hingedly connected with one another at one circumferential end so as to turn between an open position in which the other circumferential ends of said body are spaced from one another and a close position in which said cylindrical body is arranged on a steering column and the other ends of the shells are locked with one another, said cylindrical body being formed so that it completely covers the ignition lock so that an unauthorized person can not get access to the ignition lock.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 4, 4a, 4b, 4c, 4d, 4e and 4f are views showing parts of the inventive anti-theft device.

DESCRIPTION OF PREFERRED EMBODIMENTS

Figure 1:
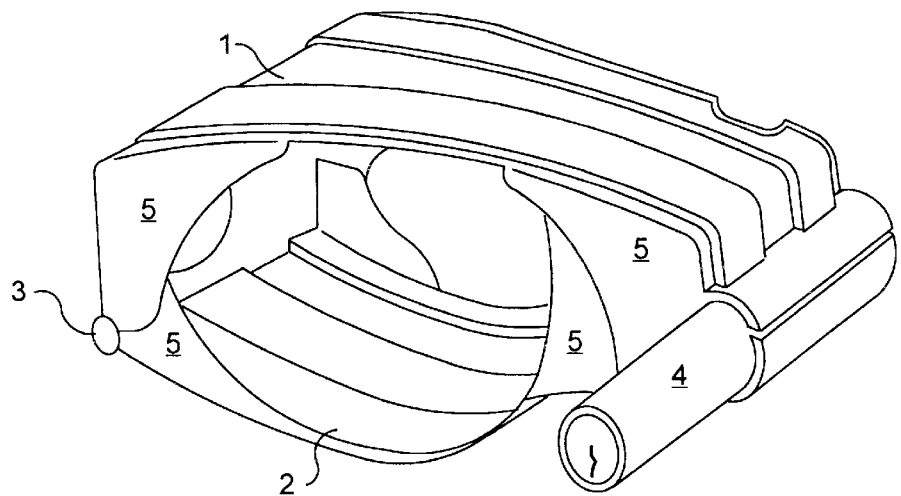
FIGS. 1 and 2 are perspective views from different positions of an anti-theft device in accordance with the present invention for a steering column of a motor vehicle.
Figure 2:
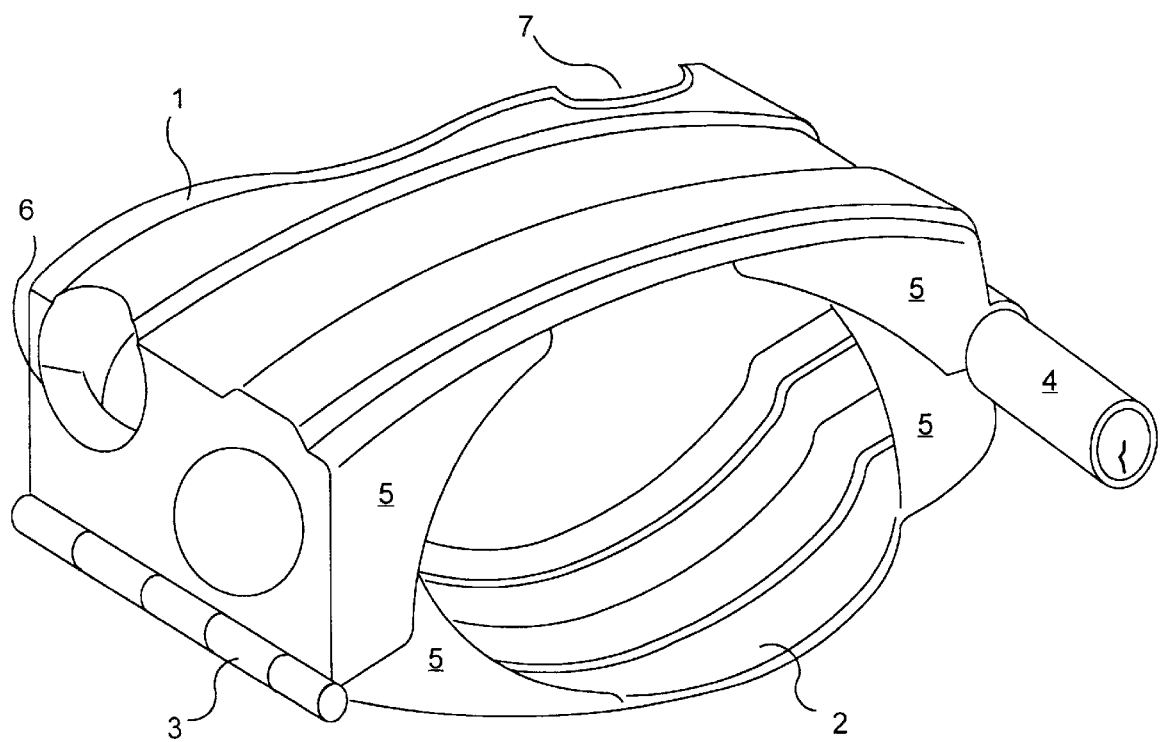
Figure 3:
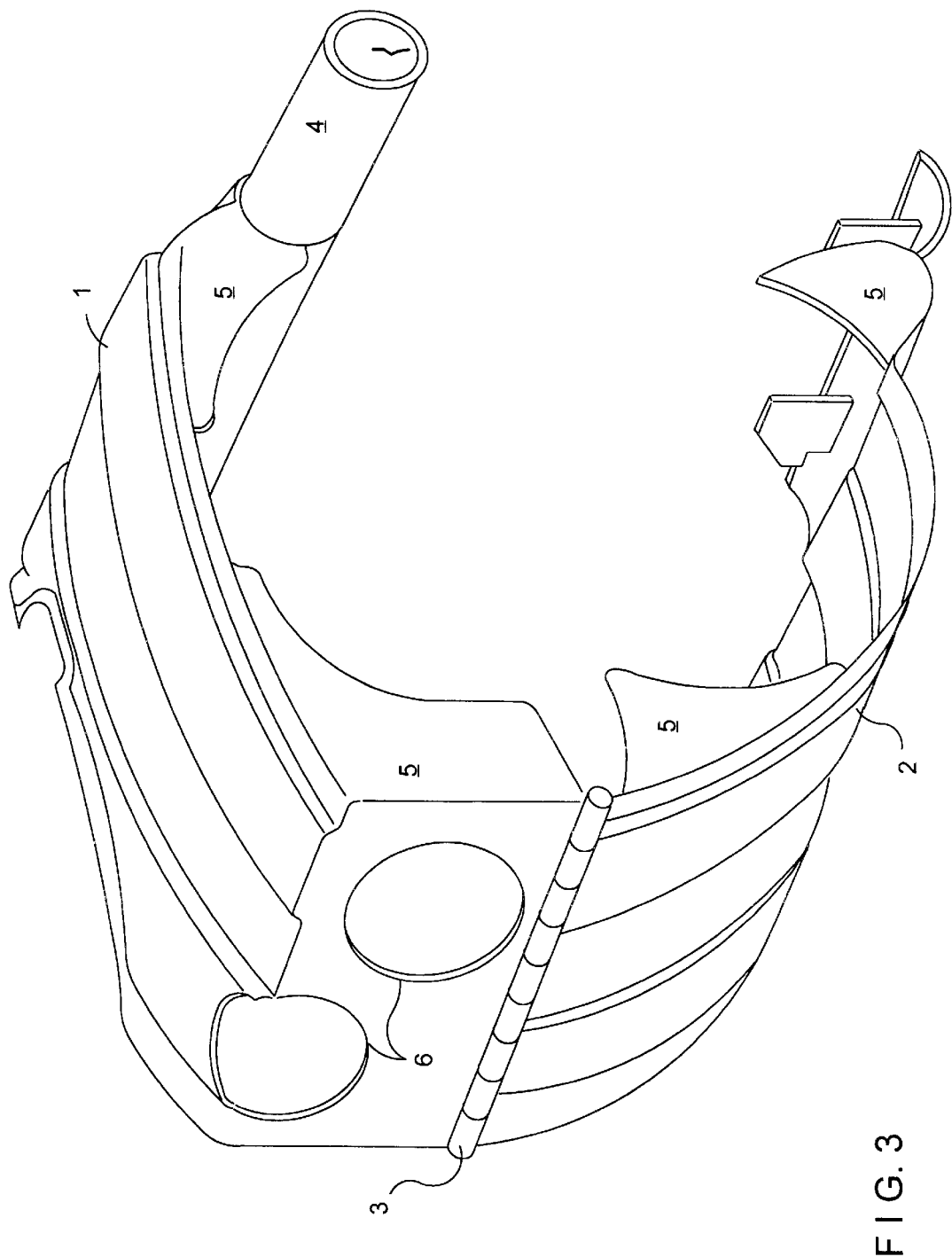
FIG. 3 is a view showing the inventive anti-theft device in an open position.

An anti-theft device in accordance with the present invention has a substantially cylindrical body which is formed as a collar to be fitted on a steering column of a vehicle. The cylindrical body has an upper shell and a lower shell which are hingedly connected with one another by a hinge 3 in the region of one circumferential end of each shell. Locking elements 9 and 10 are provided on opposite circumferential ends of the shells 1 and 2. A locking device located in a pipe 4 is connected with the element 10 of the upper shell 1. Locking hooks 11 are located in the element 9 of the lower shell 2. The element 9 reliably covers the place of contact of the elements from braking up by an unauthorized person. The shells further have additional shields 5 having different shapes and arranged at the end sides of the shells so as to prevent access to the interior of the cylindrical body.

The left part of the upper shell is provided with two openings 6, so that when the cylindrical body is fitted on the steering column the corresponding levers extend through the openings 6. After the upper shell is fitted on the steering column, the lower shell is turned around the hinge 3 so that the hooks 11 of the lower shell are locked in the locking device. The transmission lever at this point is located in a cut out 7, the knob for emergency light is located in the opening 8, and the locking device in the pipe 4 fixes the steering wheel from turning in the region of a spoke of the steering wheel.

The locking device located in the pipe 4 has a casing with a lock 12 in its end. Its turning rod carries a turning disk 13 with pins 14. A tubular core 15 is also located in the pipe 4 and is closed by a disk 16 from the side of the lock. The disk 16 has openings for passage of the pins 14. The opposite side of the tubular core 15 is closed by a disk 17. A spring 19 is located between the disk 17 and a bottom 18 of the pipe 4 so as to press the tubular core 15 toward the disk 13 of the lock 12.

Figure 5A:
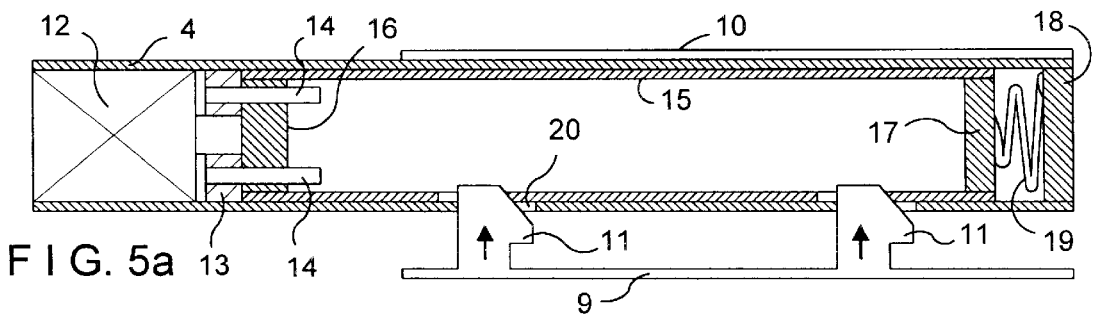
FIGS. 5a, 5b, 5c, 5d, 5e are views showing a locking mechanism of the inventive anti-theft device in different stages.
Figure 5B:
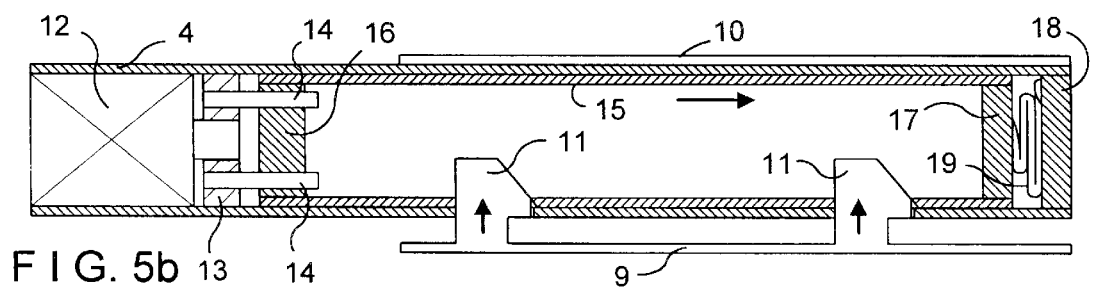
Figure 5C:
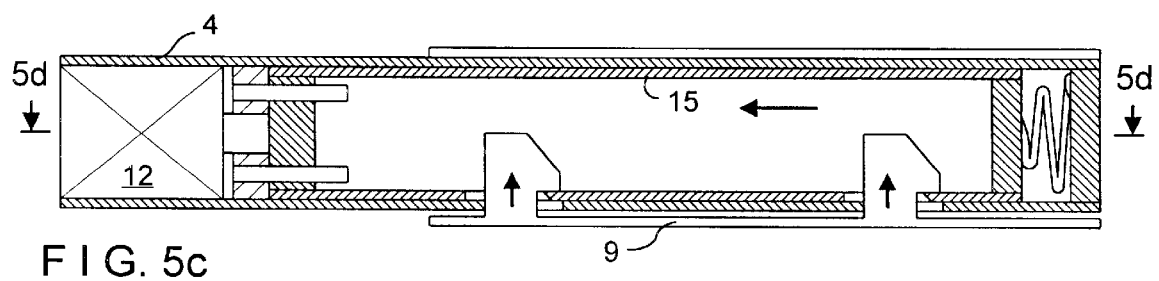
Figure 5D:
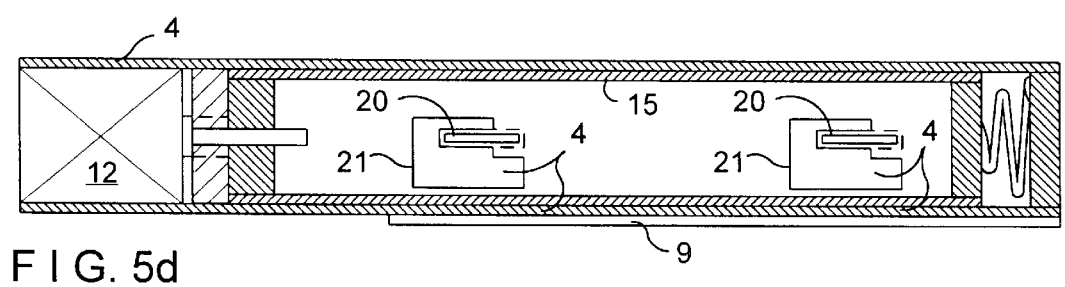
Figure 5E:
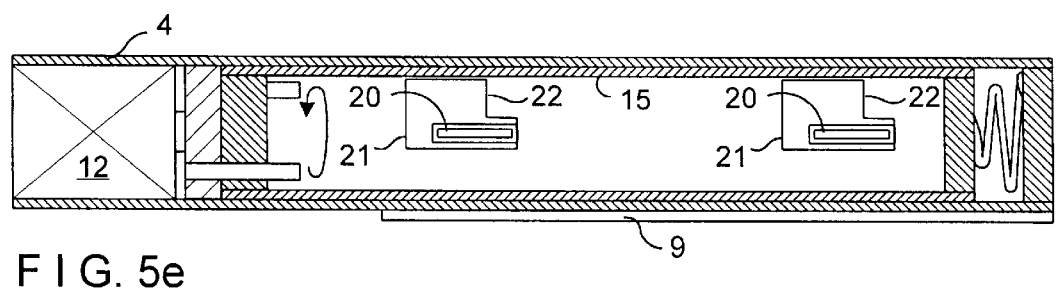

The pipe 4 has throughgoing openings 20 through which the hooks 11 can be introduced into the interior of the locking device. The tubular core 15 also has shaped cut outs 21 located so that a lower shoulder 22 of the cut out 21 in a locked position partially overlaps the throughgoing openings 20 of the pipe 4 as shown in FIGS. 5a–5d. The locking device in a position ready for locking is shown in FIG. 5a and in the locked position is shown in FIGS. 5c, 5d. During locking the hooks 11 arranged in the element 9 extend through the throughgoing openings 20 of the pipe 4 and the shaped cutouts 21 of the tubular core 15. The inclined edges of the hooks 11 abut against the inner shoulder 22 and press the tubular core in a direction opposite to the lock. The spring 19 is compressed. When the hooks 11 are pressed through the passages of the pipe and the core and are inside the core, the spring 19 relaxes and pushes the core toward the lock, the inner shoulder 22 of the shaped cut out 21 of the tubular core 15 moves under the hook 11 and locks it as shown in FIGS. 5a–5d.

In order to open the locking device, it is necessary to turn the key in the lock 12. The disk 13 turns by its pins 14 the tubular core 15 so that the inner shoulder 22 of the shaped cut out 21 moves outwardly from under the hook 11, and the expanded part of the cut out 21 is in alignment with the throughgoing opening 20 of the pipe 4. The hook is released and the lock is opened.

It will be understood that each of the elements described above, or two or more together, may also find a useful application in other types of constructions differing from the types described above.

While the invention has been illustrated and described as embodied in an anti-theft device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An ignition lock cover anti-theft device, comprising a substantially cylindrical body comprised of two substantially semi-cylindrical shells; and means for hingedly connecting said shells with one another at one circumferential end so that said shells are turnable between an open position in which the other circumferential ends of said body are spaced from one another and a closed position in which said cylindrical body is adapted to be arranged on a steering column and the other ends of the shells are locked with one another, said cylindrical body being formed so that it completely covers an ignition lock in said closed position so that an unauthorized person can not get access to the ignition lock; and means for locking the other ends of said shells in said closed position; said locking means including a first tubular locking element connected with one of the shells and having a plurality of slots, and a second locking element connected with the other of the shells and including a plurality of hook-shaped projections receivable in said slots in the closed position of said shells.

2. An anti-theft device as defined in claim 1, wherein said cylindrical body has a projection extendable into the area of a steering wheel and preventing turning of said steering wheel.

3. An anti-theft device as defined in claim 1, wherein said cylindrical body has an engaging formation adapted to engage a transmission lever and prevents turning of the transmission lever so that the transmission lever is blocked in a parking position.

4. An anti-theft device as defined in claim 1, wherein said cylindrical body has an opening for passing a further lever so that in said closed position said further lever can not be turned.

5. An anti-theft device as defined in claim 1, wherein said cylindrical body has a projection extendable into the area of a steering wheel and preventing turning of said steering wheel, said cylindrical body has an engaging formation adapted to engage a transmission lever and prevents turning of the transmission lever and the transmission lever is blocked in a parking position, said cylindrical body has an opening for passing a further lever so that in said closed position said further lever can not be turned.

6. An anti-theft device as defined in claim 1; and further comprising spring means for displacing said first element to a position in which said projections engage behind said first locking element.

7. An anti-theft device as defined in claim 6, wherein said locking elements are turnable relative to one another between a locked position in which said projections engage behind said first locking element and unlocking position in which said projections are in alignment with said slots, said locking means further comprising an activating member operatable by a key and turning said locking elements relative to one another to said unlocking position to allow unlocking said locking elements from one another and moving said other ends of said shells from said closed position to said open position so as to remove said cylindrical body from the steering column.

* * * * *